United States Patent [19]

Saito et al.

[11] Patent Number: 5,064,784

[45] Date of Patent: Nov. 12, 1991

[54] GLASS FRIT USEFUL FOR THE PREPARATION OF GLASS BUBBLES, AND GLASS BUBBLES PREPARED BY USING IT

[75] Inventors: Osamu Saito, Atsugi; Norihiko Yagi, Urawa; Yoshinori Ito, Kawaguchi, all of Japan

[73] Assignee: Tokai Kogyo Co., Ltd., Tokyo, Japan

[21] Appl. No.: 510,560

[22] Filed: Apr. 18, 1990

[30] Foreign Application Priority Data

Apr. 18, 1989 [JP] Japan .................................. 1-96474
Feb. 20, 1990 [JP] Japan .................................. 1-27252

[51] Int. Cl.$^5$ .................... C03C 3/076; C03C 3/093; C03C 3/078; C03C 38/10
[52] U.S. Cl. ........................................ 501/33; 501/39; 501/55; 501/65; 501/66; 501/67; 501/68; 501/72; 501/84
[58] Field of Search .................. 501/32, 33, 39, 55, 501/65, 69, 84; 50/21, 33, 39, 55, 53, 65, 67, 84

[56] References Cited

U.S. PATENT DOCUMENTS

| | | | |
|---|---|---|---|
| 3,365,315 | 1/1968 | Beck et al. ............................ | 106/40 |
| 4,391,646 | 7/1983 | Howell ................................. | 106/97 |
| 4,665,039 | 5/1987 | Kokubu et al. ...................... | 501/39 |
| 4,767,726 | 8/1988 | Marshall ............................... | 501/33 |

FOREIGN PATENT DOCUMENTS 2389582 12/1978 France .
1076224 7/1967 United Kingdom .
1315828 5/1973 United Kingdom .

OTHER PUBLICATIONS

Chemical Abstracts, vol. 95, No. 14, Oct. 5, 1981, p. 271, Abstract 119766f.
Chemical Abstracts, vol. 101, No. 2, Jul., 1984, p. 253, Abstract 11483q.
E. B. Shand, "Glass Engineering Handbook", 1958, 2nd Edition, pp. 93-98.

*Primary Examiner*—William R. Dixon, Jr.
*Assistant Examiner*—Michael Marcheschi
*Attorney, Agent, or Firm*—Oblon, Spivak, McClelland, Maier & Neustadt

[57] ABSTRACT

A glass frit useful as starting material for the preparation of glass bubbles having an extremely low alkali elution, which has the following composition represented by weight percent.

| | | | |
|---|---|---|---|
| $SiO_2$ | 58–75 | $B_2O_3$ | 11–25 |
| $Na_2O$ | 3–12.5 | ZnO | 0–3 |
| $K_2O$ | 0–3 | $Al_2O_3$ | 0–3 |
| $Li_2O$ | 0–3 | $P_2O_5$ | 0–3 |
| Total alkali metal oxides | | $Sb_2O_3$ | 0–1 |
| | 3–15 | $As_2O_3$ | 0–1 |
| CaO | 5–15 | $SO_3$ | 0.05–1 |
| MgO | 0–3 | $B_2O_3/Na_2O$ | 1.7–4.0 |
| Total alkaline earth metal oxides | 5–15 | | |

3 Claims, No Drawings

GLASS FRIT USEFUL FOR THE PREPARATION OF GLASS BUBBLES, AND GLASS BUBBLES PREPARED BY USING IT

The present invention relates to a new glass frit composition useful as starting material for the preparation of glass babbles having a low alkali elution, and new glass bubbles having an extremely low alkali elution (e.g. less than 0.08 meq/g) prepared by using such a glass composition.

Glass bubbles, particularly fine glass bubbles so-called glass micro balloons, have their applications still expanding as additives for various synthetic resins or as additives to putty or adhesives.

Heretofore, with respect to glass bubbles of this type, there have been some proposals for the glass composition intended to improve the mechanical strength or water resistance (e.g. U.S. Pat. Nos. 4391646 and 4767726).

These glass bubbles are prepared usually by blowing or expanding a starting material of glass powder or frits in a flame. Here, it is desired to minimize the non-expanded expanded material as far as possible so that the production cost can be reduced.

The factors for advantageously obtaining glass bubbles, include the composition of glass to be used as the starting material, the melting method, the pulverized particle size of glass to be used as the starting material and the converting method to the bubbles from the glass frit. Among them, the composition of glass frit to be used as the starting material is the most important factor.

With glass compositions of this type heretofore proposed, the conversion rate (yield) to the bubbles is from 30% to about 70%, at best, and such frit compositions are not necessarily satisfactory from the view point of the yield.

Further, with most glass bubbles, the alkali elution (alkalinity) is substantial. Therefore, when they are mixed to resins, the resins are likely to undergo blistering, or the mutual adhesion of the resins to each other is likely to be impaired.

Glass bubbles containing alkali in a substantial amount, have high hygroscopic nature, and the flowability will be impaired, and when they are mixed with a resin, undesirable streak patterns are likely to appear.

To overcome such drawbacks, it is conceivable to reduce the amount of the alkali, particularly $Na_2O$, which causes such drawbacks. However, if the amount of $Na_2O$ is simply reduced, the blowing or expansion rate of glass bubbles will be low.

Under these circumstances, the present inventors have conducted various researches and studies with an aim to develop a new glass frit composition useful as starting material for the preparation of glass bubbles, whereby the blowing rate of glass bubbles can be improved and glass bubbles having an extremely low alkali elution can be obtained.

As a result, it has been found that such an object can be accomplished by using a glass frit having the following composition characterizing in that a ratio of $B_2O_3/Na_2O$ is much higher than that of the conventional glass frit.

Thus, the glass frit useful in the present invention has a following composition represented by weight % whereby glass bubbles having an extremely low alkali elution (alkalinity) e.g. less than 0.08 meq/g especially less than 0.06 meq/g are obtainable:

| | | | |
|---|---|---|---|
| $SiO_2$ | 58–75 | $B_2O_3$ | 11–25 |
| $Na_2O$ | 3–12.5 | ZnO | 0–3 |
| $K_2O$ | 0–3 | $Al_2O_3$ | 0–3 |
| $Li_2O$ | 0–3 | $P_2O_5$ | 0–3 |
| Total alkali metal oxides | | $Sb_2O_3$ | 0–1 |
| | 3–15 | $As_2O_3$ | 0–1 |
| CaO | 5–15 | $SO_3$ | 0.05–1 |
| MgO | 0–3 | $B_2O_3/Na_2O$ | 1.7–4.0 |
| Total alkaline earth metal oxides | 5–15 | | |

Now, the present invention will be described in detail with reference to the preferred embodiments.

In the present invention, the ratio of $B_2O_3/Na_2O$ and the amount of $B_2O_3$ are critical. If these values are less than the above range, the amount of alkali elution will be substantial, and no improvement in the blowing rate will be observed. On the other hand, if they exceed the above range, the glass frit tends to undergo phase separation, and the chemical durability tends to be low. Among them, the ratio of $B_2O_3/Na_2O$ is preferably from 1.8 to 3.5, and the amount of $B_2O_3$ is preferably from 12 to 19 weight %.

It is necessary to use $SiO_2$ in an amount of from 58 to 75 weight %, preferably from 58 to 70 weight %. If the amount is less than this range, the viscosity of the glass tends to be low, and bubbles are likely to be broken at the time of blowing. On the other hand, if it exceeds the above range, the viscosity of the glass tends to be high, whereby blowing tends to be difficult.

It is necessary to employ $Na_2O$ in an amount of from 3 to 12.5 weight %, preferably from 3 to 8 weight %. If the amount of $Na_2O$ is less than the above range, the viscosity of the glass tends to be high, whereby the foaming property tends to be poor, and devitrification is likely to take place. On the other hand, if it exceeds the above range, the amount of alkali elution will be substantial, such being undesirable.

In the present invention, as other alkalis, $K_2O$ and $Li_2O$ may be used as the case requires. These components may be used to reduce the amount of elution of sodium and to improve the water resistance. The amount is up to 3 weight %, preferably, $K_2O$ is from 0.5 to 1.5 weight % and $Li_2O$ is from 0.5 to 1.2 weight %. If they are used excessively, the blowing property will be impaired, and the amount of the alkali elution tends to increase.

In the present invention, the total amount of the alkali components comprising $Na_2O$, $K_2O$ and $Li_2O$, is required to be within a range of from 3 to 15 weight %, preferably from 3 to 10 weight %. If the total amount of the alkali components is less than the above range, the viscosity of the glass tends to be high, whereby the blowing rate will be impaired, and devitrification is likely to take place. On the other hand, if the total amount exceeds the above range, the amount of alkali elution tends to increase, such being undesirable.

It is necessary to employ CaO in an amount of from 5 to 15 weight %, preferably from 7 to 12 weight %. If the amount of CaO is less than the above range, the chemical durability tends to be low, and if it exceeds the above range, the glass frit tends to be devitrified, and the shape of the expanded product, glass bubbles, tend to lose spheric nature, such being undesirable.

In the present invention, MgO may be used as other alkaline earth metal component. The amount of MgO is up to 3% by weight. If it exceeds this limit, the spheric nature of the glass bubbles obtained tend to be lost, such being undesirable.

The total amount of these alkaline earth components is from 5 to 15 weight %, preferably from 7 to 12 weight % as calculated as oxides. If the total amount is less than the above range, the chemical durability tends to be impaired. On the other hand, if it exceeds the above range, the glass tends to be devitrified, and the spheric nature of the expanded product tends to be lost, such being undesirable.

ZnO, $Al_2O_3$ and $P_2O_5$ may be optionally used, in each case with an upper limit of 3 weight %.

ZnO is used primarily for the purpose of improving the chemical durability. If it exceeds 3 weight %, the expanding rate tends to be impaired. The amount of ZnO is preferably from 1.0 to 2.5 weight %.

$Al_2O_3$ is used for the purpose of reducing the amount of alkali elution and improving the water resistance. If it exceeds 3 weight %, the viscosity of the glass tends to be high, and devitrification is likely to take place. The amount of $Al_2O_3$ is preferably from 0.5 to 1.5 weight %.

$P_2O_5$ is used for the purpose of improving the expanding rate. If it exceeds 3% by weight, the expanding rate tends to be impaired contrary to the intended purpose. The amount of $P_2O_5$ is preferably from 1.2 to 2.0 weight %.

Each of $Sb_2O_3$ and $As_2O_3$ may be optionally used with an upper limit of 1% by weight.

$Sb_2O_3$ is used for the purpose of improving the foaming property. However, if it exceeds 1% by weight, the expansion rate is impaired contrary to the intended purpose, and the operation efficiency tends to be impaired.

$As_2O_3$ is used for the purpose of improving the foaming property. However, if it exceeds 1% by weight, not only such an object will be impaired, but also the operation efficiency will be impaired.

Further, in the present invention, it is necessary to employ $SO_3$ in an amount of from 0.05 to 1 weight %. If the amount is less than this range, the expansion rate tends to be inadequate. On the other hand, if it exceeds the above range, the blowing tends to be so vigorous that glass bubbles are likely to be destroyed, whereby the yield will be low.

Each of these starting materials can be prepared in the form of an oxide. However, it is also possible to employ starting materials which can be converted to the corresponding oxides during the melting step.

For the melting, a suitable method for melting the glass material of this type may be employed. However, it is preferred to select the composition of the starting material so that the temperature having a glass viscosity of 320 poise ($\log \eta = 2.5$) will be from 1000° to 1200° C., and to melt at the temperature of surface of glass batch being from 1250° to 1350° C. Since blowing can thereby be conducted in the most preferred state.

Further, by selecting the composition so that the thermal conductivity of the glass frit will be within a range of from $2.2 \times 10^{-3}$ to $2.6 \times 10^{-3}$ cal/cm·deg·sec, it is possible to obtain glass bubbles having superior uniformity in the wall thickness, etc. without creating an internal stress.

The thermal conductivity is the one measured by a Shalbe method as described on page 169 of Glass Treatment Handbook issued by Japan-Soviet Communication Company (1975).

The glass frit thus obtained by melting, is cooled and pulverized for use for the preparation of glass bubbles.

As the particle size of the pulverized glass frit, it is preferred to employ an average particle size of from 12 to 65 μm. Within this range, it is possible to obtain glass bubbles rich in the spheric nature and having a high blowing rate.

In the present invention, the frit prepared as described above, is then subjected to blowing to form glass bubbles. The blowing method to obtain glass bubbles, is not particularly limited, and a suitable known method may be employed. For example, the starting material is passed through a flame of from 1000° to 1200° C. for from 0.1 to 5 seconds, whereby glass bubbles can be obtained with a conversion or blowing rate of from 70 to 90% (the weight ratio of glass bubbles having a density of not higher than 1.0 to the glass frit used).

Thus, glass bubbles having the following composition represented by weight %, can be produced:

| $SiO_2$ | 60–80 | $B_2O_3$ | 6–15 |
|---|---|---|---|
| $Na_2O$ | 2–12.5 | ZnO | 0–3 |
| $K_2O$ | 0–3 | $Al_2O_3$ | 0–3 |
| $Li_2O$ | 0–3 | $P_2O_5$ | 0–2.8 |
| Total alkali metal oxides | | $Sb_2O_3$ | 0–1 |
| | 2–12.5 | $As_2O_3$ | 0–1 |
| CaO | 5–15 | $SO_3$ | 0.05–1 |
| MgO | 0–3 | $B_2O_3/Na_2O$ | 1.2–3.5 |
| Total alkaline earth metal oxides | 5–15 | | |

The glass bubbles of the present invention having a composition described above is new especially in the ratio of $B_2O_3/Na_2O$ and the content of $B_2O_3$, and an alkalinity of less than 0.08 meq/g even less than 0.06 meq/g.

Among the glass bubbles mentioned above, the glass bubbles having a following composition as represented by weight % is preferred, since the conversion rate will be further increased to a level of from 78 to 90% and the glass bubbles obtained have an extremely low alkali elution.

| $SiO_2$ | 65–75 | $B_2O_3$ | 7–12 |
|---|---|---|---|
| $Na_2O$ | 3–6 | ZnO | 1.0–2.5 |
| $K_2O$ | 0.5–1.5 | $Al_2O_3$ | 0.5–1.5 |
| $Li_2O$ | 0.5–1.2 | $P_2O_5$ | 1.1–2.0 |
| Total alkali metal oxides | | $Sb_2O_3$ | 0–1 |
| | 3–8 | $As_2O_3$ | 0–1 |
| CaO | 8–13 | $SO_3$ | 0.05–1 |
| MgO | 0–3 | $B_2O_3/Na_2O$ | 1.35–3.0 |
| Total alkaline earth metal oxides | 8–13 | | |

The glass bubbles of the present invention described above having usually a gravity of from 0.08 g/cc to 0.8 g/cc show an extremely low hygroscopic nature and superior flowability due to their very low alkali elution. Thus, the glass bubbles can be easily mixed with a resin and the characteristic nature of the resin will not be impared whereby an injection-molded article and an extrusion-molded article can be easily obtained by using the glass bubbles of the present invention.

Now, the present invention will be described in further detail with reference to Examples. However, it should be understood that the present invention is by no means restricted by such specific Examples. In the present invention, the alkali elution of the glass bubbles (alkalinity) is determined by the method of AWS-/ASTM D 3100-78. Further a density of the glass bubbles is determined by the method of ANS/ASTM D-2840-69.

EXAMPLE 1

The following materials were mixed and melted by means of a crucible at a surface temperature of 1350° C., to obtain a glass frit. The numerical values of the materials represent gram.

| Silicon dioxide | 6600 | Aluminum oxide | 50 |
| --- | --- | --- | --- |
| Soda ash | 1220 | Calcium secondary phosphate | 400 |
| Lime | 1650 | Lithium carbonate | 250 |
| Boric acid | 2520 | Potassium carbonate | 150 |
| Zinc oxide | 100 | Sodium sulfate | 120 |

The composition of the frit thus obtained was as identified in Table 1. The temperature of this frit at log $\eta = 2.5$, was 1130° C. Further, the thermal conductivity was $2.4 \times 10^{-3}$ cal/cm·deg·sec.

8000 g of this frit was pulverized in a ball mill together with 30000 g of pulverizing balls, and then classified by a vibrating sieve to obtain a powder with a particle size of not more than 57 $\mu$m being 90%, not more than 33 $\mu$m being 50%, and not more than 11 $\mu$m being 10%.

This powder and a preliminarily mixed combustion gas of air and LPG were continuously supplied into a blowing furnace at rates of 25 g/min and 600 l/min, respectively, and the temperature in the furnace was maintained at 1100° C.

The retention time of the glass powder in the furnace was 0.5 seconds, and the glass bubbles obtained were immediately collected by a collecting device in an yield of 95%.

The collected bubbles were put into water, whereupon the floating product (glass bubbles) and the sedimented product were separated. The volume % and the density of the floating product and the sedimented product, and the alkali elution (alkalinity) of the floating product, were shown in Table 2. When the alkalinity was measured, the floating product was employed after washing off the substance deposited on the surface.

The composition of the glass bubbles was as shown in Table 3.

EXAMPLE 2

A glass frit was prepared in the same manner as in Example 1 except that sodium sulfate was used in an amount of 80 g. The composition of the frit thus obtained was as shown in Table 1.

The temperature of this cullet at log $\eta = 2.5$, was 1130° C. Further, the thermal conductivity was $2.4 \times 10^{-3}$ cal/cm·deg·sec. This frit was pulverized in the same manner as in Example 1, classified and blown, whereupon the floating product and the sedimented product were collected. The floating rate and the sedimented rate and the density as well as alkali elution of the floating product, are shown in Table 2.

The composition of the glass bubbles was as shown in Table 3.

EXAMPLE 3

The following materials were mixed, and a glass frit was prepared in the same manner as in Example 1. The numerical values of the materials represent g:

| Silicon dioxide | 4800 | Aluminum oxide | 120 |
| --- | --- | --- | --- |
| Soda ash | 450 | Sodium pyrophosphate | 380 |
| Lime | 1100 | Lithium carbonate | 200 |
| Boric acid | 2900 | Potassium carbonate | 110 |
| Zinc oxide | 120 | Sodium sulfate | 100 |

The composition of the frit thus obtained was as shown in Table 1.

The temperature of this frit at log $\eta = 2.5$, was 1050° C. Further, the thermal conductivity was $2.4 \times 10^{-3}$ cal/cm·deg·sec.

This frit was pulverized in the same manner as in Example 1, classified and blown, whereupon the floating product and the sedimented product were collected. The floating rate and the sedimented rate and the specific gravities as well as the alkali elution of the floating product are shown in Table 2.

The composition of the glass bubbles was as shown in Table 3.

EXAMPLE 4

The following materials were mixed, and a glass frit was prepared in the same manner as in Example 1. The numerical values of the materials represent g:

| Silicon dioxide | 6420 | Aluminum oxide | 110 |
| --- | --- | --- | --- |
| Soda ash | 160 | Calcium secondary phosphate | 280 |
| Calcium carbonate | 1450 | Lithium carbonate | 220 |
| Borax (pentahydrate) | 2750 | Potassium carbonate | 150 |
| Magnesium oxide | 280 | Sodium sulfate | 100 |

The composition of the frit thus obtained was as shown in Table 1. The temperature of this frit at log $\eta = 2.5$, was 1160° C. Further, the thermal conductivity was $2.45 \times 10^{-3}$ cal/cm·deg·sec.

This frit was pulverized in the same manner as in Example 1, classified and blown, whereupon the floating product and the sedimented product were collected. The floating rate and the sedimented rate and the specific gravities as well as the alkali elution of the floating product, were as shown in Table 2. Further, the composition of the glass bubbles was as shown in Table 3.

EXAMPLE 5

The following materials were mixed, and a glass cullet was prepared in the same manner as in Example 1. The numerical values of the materials represent g:

Silicon dioxide 11400
Calcium carbonate 3010
Borax (pentahydrate) 5280
Sodium sulfate 200

The composition of the frit thus obtained was as shown in Table 1. The temperature of this frit at log $\eta = 2.5$, was 1170° C. Further, the thermal conductivity was $2.4 \times 10^{-3}$ cal/cm·deg·sec.

This frit was pulverized in the same manner as in Example 1, classified and blown, whereupon the floating product and the sedimented product were collected. The floating rate and the sedimented rate and the specific gravities as well as the alkali elution of the floating product, are shown in Table 2.

The composition of the glass bubbles was as shown in Table 3.

EXAMPLE 6

The following materials were mixed, and a glass cullet was prepared in the same manner as in Example 1. The numerical values of the materials represent g:

| Silicon dioxide | 10870 | Calcium secondary phosphate | 710 |
| Soda ash | 120 | Lithium carbonate | 410 |
| Calcium carbonate | 2600 | Potassium carbonate | 230 |
| Borax (pentahydrate) | 4560 | Arsenic trioxide | 100 |
| Zinc oxide | 180 | Antimony trioxide | 100 |
| Aluminum oxide | 90 | Sodium sulfate | 240 |

The composition of the frit thus obtained was as shown in Table 1. The temperature of this frit at log $\eta = 2.5$, was 1130° C. Further, the thermal conductivity was $2.4 \times 10^{-3}$ cal/cm·deg·sec.

This frit was pulverized in the same manner as in Example 1, classified and blown, whereupon the floating product and the sedimented product were collected. The floating rate and the sedimented rate and the specific gravities as well as alkali elution of the floating product, are as shown in Table 2.

The composition of the glass bubbles was as shown in Table 3.

COMPARATIVE EXAMPLE

The following materials were mixed, and a glass frit was prepared in the same manner as in Example 1. The numerical values of the materials represent g:

| Silicon dioxide | 7100 | Aluminum oxide | 40 |
| Soda ash | 1520 | Sodium pyrophosphate | 410 |
| Lime | 1790 | Lithium carbonate | 250 |
| Boric acid | 1160 | Sodium sulfate | 110 |

The composition of the frit thus obtained was as shown in Table 1. The temperature of this frit at log $\eta = 2.5$, was 1240° C. Further, the thermal conductivity was $2.41 \times 10^{-3}$ cal/cm·deg·sec.

This frit was pulverized in the same manner as in Example 1, classified and blown, whereupon the floating product and the sedimented product were collected. The floating rate and the sedimented rate and the specific gravities as well as the alkali elution of the floating product, are as shown in Table 2.

The composition of the glass bubbles was as shown in Table 3.

TABLE 1

| | Example 1 | Example 2 | Example 3 | Example 4 | Example 5 | Example 6 | Comparative Example |
|---|---|---|---|---|---|---|---|
| $SiO_2$ | 64.3 | 64.8 | 60.5 | 63.6 | 67.5 | 63.6 | 70.1 |
| $B_2O_3$ | 13.2 | 12.8 | 18.9 | 13.0 | 14.5 | 12.9 | 6.5 |
| $Na_2O$ | 7.1 | 6.9 | 5.6 | 7.0 | 7.0 | 7.1 | 10.0 |
| CaO | 9.6 | 10.0 | 7.8 | 8.8 | 10.1 | 9.7 | 10.5 |
| $K_2O$ | 1.0 | 1.0 | 1.1 | 1.0 | — | 1.0 | — |
| ZnO | 1.0 | 1.0 | 1.5 | — | — | 1.0 | — |
| $Al_2O_3$ | 0.6 | 0.5 | 1.4 | 1.2 | — | 0.7 | 0.4 |
| $P_2O_5$ | 1.5 | 1.6 | 1.6 | 1.1 | — | 1.6 | 1.0 |
| $SO_3$ | 0.55 | 0.35 | 0.5 | 0.35 | 0.41 | 0.41 | 0.5 |
| $Li_2O$ | 0.95 | 1.0 | 0.7 | 0.9 | — | 1.0 | 0.8 |
| MgO | — | — | — | 2.7 | — | — | — |
| $As_2O_3$ | — | — | — | — | — | 0.4 | — |
| $Sb_2O_3$ | — | — | — | — | — | 0.4 | — |
| $B_2O_3/Na_2O$ | 1.86 | 1.86 | 3.38 | 1.86 | 2.07 | 1.82 | 0.65 |

TABLE 2

| | Floating product (bubbles having a density of at most 1.0) | | | Sedimented product (bubbles having a density of at least 1.0) | | | Alkali elution meq/g |
|---|---|---|---|---|---|---|---|
| | vol % | wt % | density | vol % | wt % | density | |
| Example 1 | 97 | 87 | 0.25 | 3 | 13 | 1.44 | 0.049 |
| Example 2 | 93 | 83 | 0.48 | 7 | 17 | 1.50 | 0.047 |
| Example 3 | 96 | 83 | 0.29 | 4 | 16 | 1.50 | 0.042 |
| Example 4 | 93 | 78 | 0.44 | 7 | 22 | 1.62 | 0.059 |
| Example 5 | 92 | 73 | 0.37 | 8 | 27 | 1.59 | 0.043 |
| Exmaple 6 | 95 | 80 | 0.33 | 5 | 20 | 1.48 | 0.056 |
| Comparative Example | 83 | 54 | 0.34 | 17 | 46 | 1.40 | 0.107 |

TABLE 3

| | Example 1 | Example 2 | Example 3 | Example 4 | Example 5 | Example 6 |
|---|---|---|---|---|---|---|
| $SiO_2$ | 70.5 | 70.5 | 68.9 | 71.0 | 74.4 | 70.9 |
| $B_2O_3$ | 7.8 | 7.7 | 11.5 | 7.7 | 8.4 | 7.4 |
| $Na_2O$ | 4.9 | 4.8 | 4.0 | 5.0 | 4.8 | 5.3 |
| CaO | 11.1 | 11.2 | 8.6 | 9.4 | 11.3 | 10.7 |
| $K_2O$ | 0.8 | 0.7 | 0.8 | 0.6 | — | 0.60 |
| ZnO | 1.0 | 1.0 | 1.5 | — | — | 1.0 |
| $Al_2O_3$ | 0.8 | 0.7 | 1.5 | 1.3 | — | 0.7 |
| $P_2O_5$ | 1.4 | 1.5 | 1.5 | 1.0 | — | 1.5 |
| $SO_3$ | 0.30 | 0.20 | 0.25 | 0.24 | 0.26 | 0.28 |
| $Li_2O$ | 0.86 | 0.86 | 0.60 | 0.70 | — | 0.75 |
| MgO | — | — | — | 2.8 | — | — |
| $As_2O_3$ | — | — | — | — | — | 0.11 |
| $Sb_2O_3$ | — | — | — | — | — | 0.20 |
| $B_2O_3/Na_2O$ | 1.59 | 1.60 | 2.88 | 1.54 | 1.75 | 1.40 | numerical values of the materials represent g:

We claim:

1. Glass bubbles having a low alkali elution, which has the following composition by weight percent:

| | | | |
|---|---|---|---|
| $SiO_2$ | 60–80 | $B_2O_3$ | 6–15 |
| $Na_2O$ | 2–12.5 | ZnO | 0–3 |
| $K_2O$ | 0–3 | $Al_2O_3$ | 0–3 |
| $Li_2O$ | 0–3 | $P_2O_5$ | 0–3 |
| Total alkali metal oxides | | $Sb_2O_3$ | 0–1 |
| | 2–12.5 | $As_2O_3$ | 0–1 |
| CaO | 5–15 | $SO_3$ | 0.05–1 |
| MgO | 0–3 | $B_2O_3/Na_2O$ | 1.2–3.5 |
| Total alkaline earth metal oxides | 5–15 | | | wherein the alkali elution is less than 0.08 meq/g.

2. Glass bubbles according to claim 1, wherein the ratio of $B_2O_3/Na_2O$ is from 1.35 to 3.0.

3. Glass bubbles according to claim 2, wherein the glass bubbles have the following composition by weight percent:

| | | | |
|---|---|---|---|
| $SiO_2$ | 65–75 | $B_2O_3$ | 7–12 |
| $Na_2O$ | 3–6 | ZnO | 1.0–2.5 |
| $K_2O$ | 0.5–1.5 | $Al_2O_3$ | 0.5–1.5 |
| $Li_2O$ | 0.5–1.2 | $P_2O_5$ | 1.1–2.0 |
| Total alkali metal oxides | | $Sb_2O_3$ | 0–1 |
| | 4–8 | $As_2O_3$ | 0–1 |
| CaO | 8–13 | $SO_3$ | 0.05–1 |
| MgO | 0–3 | | |
| Total alkaline earth metal oxides | 8–13. | | |

* * * * *